Figure 1:
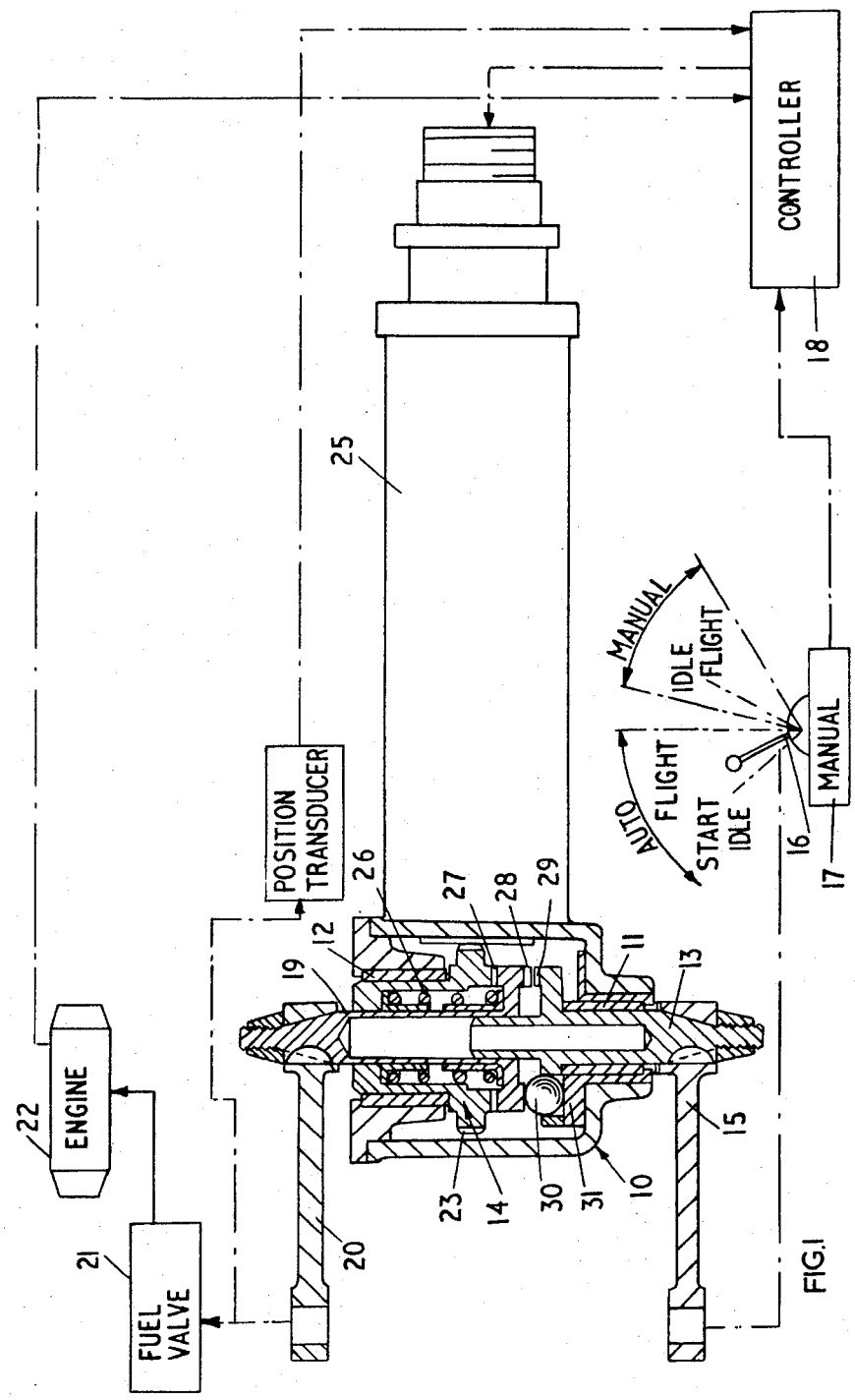

United States Patent [19]

Bloom

[11] 3,861,508
[45] Jan. 21, 1975

[54] ACTUATOR DEVICE FOR USE IN A GAS TURBINE ENGINE FUEL CONTROL

[75] Inventor: Joseph Louis Bloom, Droitwich, England

[73] Assignee: Lucas Aerospace Ltd., Birmingham, England

[22] Filed: July 5, 1973

[21] Appl. No.: 376,437

[30] Foreign Application Priority Data
July 5, 1972 Great Britain.................... 31386/72

[52] U.S. Cl.............................. 192/48.5, 192/89 A
[51] Int. Cl........................................... F16d 47/02
[58] Field of Search .......... 74/625; 192/48.5, 49.91, 192/89 A

[56] References Cited
UNITED STATES PATENTS

| | | | |
|---|---|---|---|
| 1,850,197 | 3/1932 | Bodenhorn........................ | 192/48.5 |
| 1,988,590 | 1/1935 | Geiger.............................. | 192/89 A |
| 2,332,743 | 10/1943 | Morris.............................. | 192/89 A |
| 2,658,396 | 11/1953 | Christiance...................... | 192/89 A |
| 2,753,736 | 7/1956 | Mitchell........................... | 192/48.91 |
| 2,775,908 | 1/1957 | Elliott et al...................... | 74/625 |
| 2,934,317 | 2/1960 | Holstein........................... | 192/48.5 |
| 3,363,480 | 1/1968 | Murphy............................ | 74/625 |

Primary Examiner—Wesley S. Ratliff, Jr.
Attorney, Agent, or Firm—Holman & Stern

[57] ABSTRACT

An actuator device in accordance with the invention comprises first and second angularly movable input members and an angularly movable output member, dog means for interconnecting the second input member and the output member, resilient means arranged to disengage said dog means, means actuable by the first input member for interengaging the dog means when the first input member is in any position within one part of its range of movement and permitting disengagement of said dog means when the first input member is in any position within another part of its range of movement, and coupling means for connecting the first input member to the output member under the action of said resilient member when the second input member is within said other part of its range of movement, the arrangement being such that initial engagement of said coupling means can only be effected when the first input member is in a position within said other part of its range of movement corresponding to the position for the time being of the output member and said dog means is fully disengaged only when said coupling means is engaged.

9 Claims, 3 Drawing Figures

FIG.1

:

ACTUATOR DEVICE FOR USE IN A GAS TURBINE ENGINE FUEL CONTROL

This invention relates to an actuator device for use in a gas turbine engine fuel control.

An actuator device in accordance with the invention comprises first and second angularly movable input members and an angularly movable output member, dog means for interconnecting the second input member and the output member, resilient means arranged to disengage said dog means, means actuable by the first input member for interengaging the dog means when the first input member is in any position within one part of its range of movement and permitting disengagement of said dog means when the first input member is in any position within another part of its range of movement, and coupling means for connecting the first input member to the output member under the action of said resilient member when the second input member is within said other part of its range of movement, the arrangement being such that initial engagement of said coupling means can only be effected when the first input member is in a position within said other part of its range of movement corresponding to the position for the time being of the output member and said dog means is fully disengaged only when said coupling means is engaged.

Figure 2:
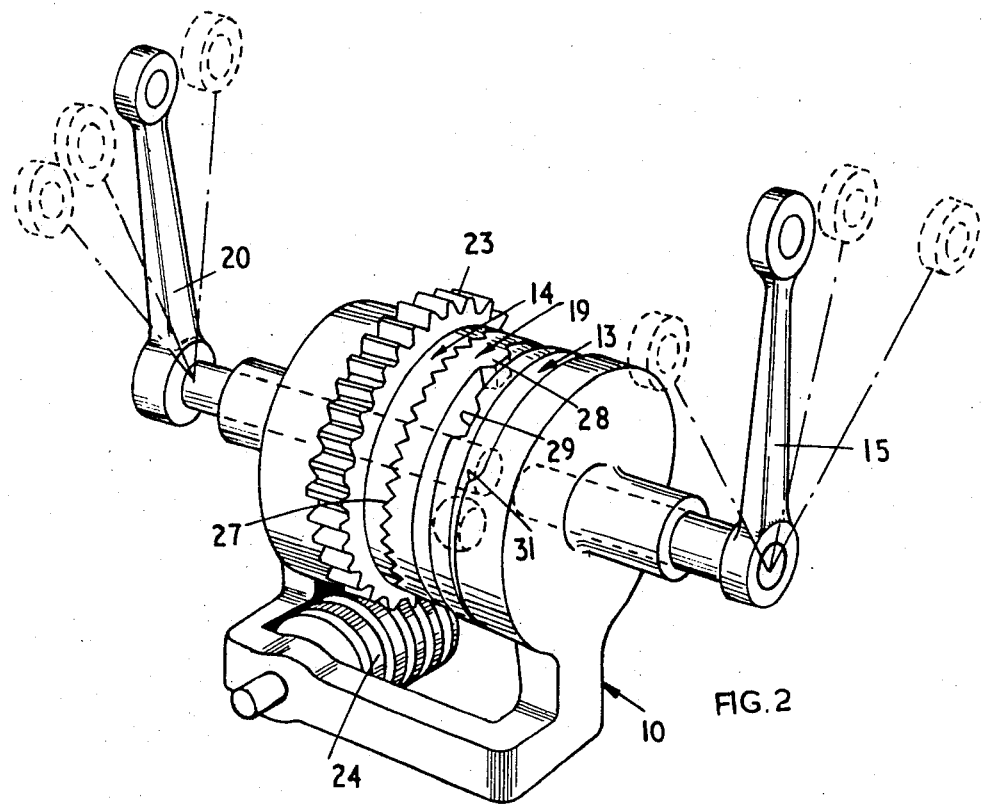
Figure 3:
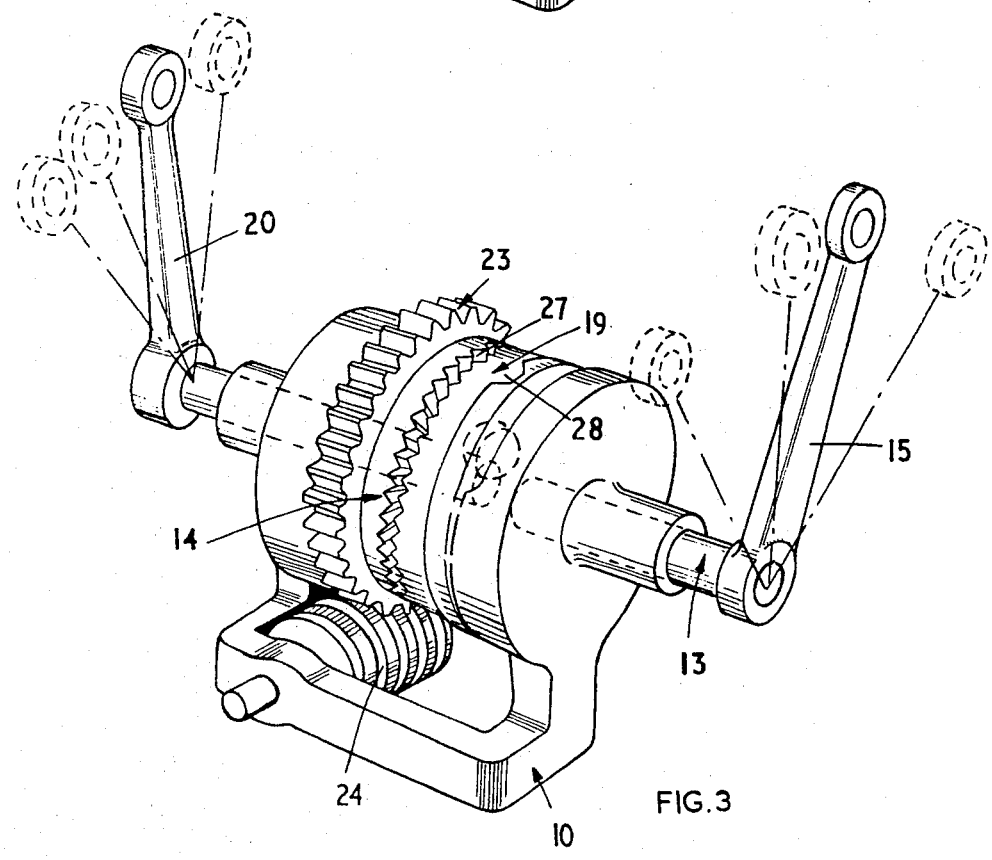

In the accompanying drawings:

FIG. 1 is a somewhat diagrammatic illustration of a fuel system including an example of an actuator device in accordance with the invention, the actuator device being shown in section, and FIGS. 2 and 3 are diagrammatic perspective views showing the actuator device in different conditions.

The actuator device shown has a body 10 having aligned bearings 11 and 12, supporting first and second angularly movable input members 13 and 14 respectively. First input member has an arm 15 thereon which is mechanically coupled to a manual control lever 16 which also actuates an electrical control device 17 for supplying a "desired speed" signal to an electronic controller 18. The lever 16 has a gate (not shown) associated with it to divide its range of movement into two parts for automatic and manual control respectively. The gate may take any conventional form such that some additional operation, such as a lateral displacement of the lever, is required to move the lever 16 from one part of its range of movement to the other.

The second input member 14 has an axial through bore through which an output member 19 extends, such output member being angularly movable about the common axis of the input members 13, 14 and also axially displaceable. An arm 20 is provided on the output member 19 and this is connected in use to a fuel valve 21 which controls the supply of fuel to the engine 22.

The second input member 14 has worm-wheel teeth 23 which engage a worm 24 driven by an electric servo-motor unit 25 including a reduction gear train and a tacho-generator speed control. This servomotor unit 25 is driven by pulses supplied by the controller 18.

A spring 26 acts on the output member 19 and urges this axially towards the first input member 13, tending to disengage dog means 27 provided on the second input member 14 and the member 19 and to engage coupling means in the form of a single dog 28 on the output member 19 and a coacting single slot 29 in the first input member 13. For causing the dog means 27 to be engaged a ball 30 is contained in a bore in the first input member 14 and is interposed between the output member 19 and a fixed face cam 31 provided on the body 10. This cam 31 is arranged so that the ball 30 displaces the output member 19 to engage the dog means 27 whenever the lever 16, and hence the input member 13, is in the automatic part of its range of movement, the coupling means then being disengaged, and to permit movement of the output member 19 under the influence of the spring 26 when-ever the lever 16 is in the manual part of its range of movement.

In this latter condition the coupling means can only be fully engaged when the slot 29 is aligned with the dog 28, i.e. when the input member 13 occupies a particular position corresponding to the position for the time being of the output member. When the input member 13 does not occupy this particular position the dog 28 can ride over the face of the input member 13, preventing the member 19 from completing its full axial movement under the influence of the spring 26. The dog means 22 is arranged so that it is not fully disengaged when the dog 28 is riding on the surface of the member 13.

In use for normal flight the required speed of the engine is selected by placing the lever 16 in any desired position within the automatic part of its range of movement. The electronic controller 18 then monitors the engine running and drives the second input member 14 to a position such that the fuel delivered to the engine is sufficient for the engine to run at the required speed. In the event of an electronic failure the pilot will be warned by a suitable failure warning (not shown), the motor 25 is de-energised. The wormwheel 23 is thereby locked against rotation, and the output member 19 cannot therefore be turned until the dog means 27 has been fully disengaged. The pilot can assume manual control of the engine by moving the lever 16 into the manual part of its range of movement and then gradually moving it forwards until it occupies a position corresponding to that in which the output member 19 is locked. The coupling means 28, 29, then becomes fully engaged and the dog means 27 is fully disengaged and the control of the output member 19 is then directly dependent on movement of the lever 16.

I claim:

1. An actuator device for use in a gas turbine engine fuel control, comprising in combination: a body, first and second input members mounted on the body for independent angular movement relative thereto and directly connected to separate control devices, an angular movable output member mounted on the body for angular movement relative thereto and also axial movement relative thereto, dog means on said output member and said second input member for providing a driving connection therebetween, resilient means acting on said output member so as to tend to urge the output member in a direction to disengage said dog means, means actuable by said first input member for interengaging said dog mens whenever the first input member is in any position within one part of its range of movement relative to the body and permitting disengagement of said dog means whenever the first input member is in any position within another part of its range of movement relative to the body and coupling means for connecting the first input member to the output member under the action of said resilient member when the first input member is within said other part of its range of movement, said coupling means being operative for preventing axial movement of the output member under the action of said resilient means sufficient to fully disengage the dog means except when said first input member is brought into a position with said other part of its range of movement corresponding to the simultaneously position of the output member.

2. An actuator device as claimed in claim 1 in which the output member and the input member are discs and said coupling means comprises a slot in one member and a projection on the other so that engagement of the projection with any part of said one member other than said slot prevents sufficient movement of said output to disengage said dog means.

3. An actuator device as claimed in claim 2 in which the means actuable by the first input member comprises a ball in a hole in the first input member engaged between a face cam on the body of the device and the output member.

4. An actuator device as claimed in claim 3 in which the second input member is in the form of a wormwheel engaged by a worm rotatably mounted on the body.

5. An actuator device as claimed in claim 4 further comprising an electric motor for driving the worm.

6. An actuator device as claimed in claim 1 in which the second input member is in the form of a wormwheel engaged by a worm rotatably mounted on the body.

7. An actuator device as claimed in claim 6 further comprising an electric motor for driving the worm.

8. An actuator device as claimed in claim 1 in which the means actuable by the first input member comprises a ball in a hole in the first input member engaged between a face cam on the body of the device and the output member.

9. An actuator device comprising, in combination a body, co-axial first and second rotary input members journalled in said body and conductive to separate control devices, a rotary output member journalled in said second input member, dog means on the output member and the second input member for drivingly interconnecting such members, a spring acting between the second input member and the output member to tend to disengage the dog means, a face cam fixed in the body, a cam follower rotatable with the first input member and disposed between the cam and the second input member so as to control the engagement of said dog means in accordance with the angular position of the first input member, a dog on the output member, a planar face on the first input directed towards said dog and formed with a single slot to receive said dog when the first input member is in a specific angular position relative to the output member, the cam being shaped so that over one portion of the range of movement of the first input member the cam follower causes interengagement of the dog means and over another portion of such range of movement the cam follower does not prevent disengagement of the dog means, such disengagement being prevented by the engagement of the dog with said planar face until the first input member is moved into its specific angular position relative ot the output member whereupon the dog enters the slot to provide a driving connection between the first input member and the output member, and a worm and wheel drive arrangement for the second input member.

* * * * *